United States Patent
Liu et al.

(10) Patent No.: US 12,391,343 B2
(45) Date of Patent: Aug. 19, 2025

(54) DRAG-REDUCING SEPARATOR PLATE AND DESIGN METHOD THEREFOR

(71) Applicants: China Merchants Marine Offshore Research Institute Co., Shenzhen (CN); China Merchants Deepsea Research Institute (Sanya) Co., Yazhou Sanya (CN); China Merchants Heavy Industry (Jiangsu) Co., Ltd., Nantong (CN)

(72) Inventors: Jiancheng Liu, Shenzhen (CN); Xiuzhan Zhang, Shenzhen (CN); Shipeng Wang, Shenzhen (CN); Xingqun Li, Nantong (CN); Lixin Xu, Nantong (CN)

(73) Assignees: China Merchants Marine Offshore Research Institute Co., Shenzhen (CN); China Merchants Deepsea Research Institute (Sanya) Co., Shenzhen (CN); China Merchants Heavy Industry (Jiangsu) Co., Ltd, Shenzhen (CN)

( * ) Notice: Subject to any disclaimer, the term of this patent is extended or adjusted under 35 U.S.C. 154(b) by 765 days.

(21) Appl. No.: 17/597,959

(22) PCT Filed: Apr. 25, 2019

(86) PCT No.: PCT/CN2019/084172
§ 371 (c)(1),
(2) Date: Jan. 31, 2022

(87) PCT Pub. No.: WO2020/172984
PCT Pub. Date: Sep. 3, 2020

(65) Prior Publication Data
US 2023/0147054 A1    May 11, 2023

(30) Foreign Application Priority Data

Feb. 27, 2019   (CN) .......................... 201910144064.1

(51) Int. Cl.
*B63B 35/44*     (2006.01)
*B63B 3/14*      (2006.01)
(Continued)

(52) U.S. Cl.
CPC ............... *B63B 35/44* (2013.01); *B63B 3/14* (2013.01); *B63B 71/00* (2020.01); *B63B 2003/147* (2013.01); *B63B 35/03* (2013.01)

(58) Field of Classification Search
CPC .......... B63B 35/00; B63B 35/44; B63B 3/00; B63B 3/14; B63B 71/00; B63B 2003/147
(Continued)

(56) References Cited

U.S. PATENT DOCUMENTS 6,910,438 B2 *  6/2005  Leverette .............. B63B 39/005
                                                        114/265

FOREIGN PATENT DOCUMENTS

CN           105564604 A  *  5/2016  ......... B63B 35/4413

* cited by examiner

*Primary Examiner* — Lars A Olson
(74) *Attorney, Agent, or Firm* — Proi Intellectual Property US

(57) ABSTRACT

A drag-reducing separator plate for a moonpool, wherein the upper part thereof is a straight wall perpendicular to the sea level, the lower part thereof is connected to a baffle, and a connecting portion is connected between the straight wall and the baffle. The connecting portion may be in the shape of an arc. The shape of the drag-reducing separator plate matches that of the rear wall of the moonpool. During navigation, the drag-reducing separator plate is located in the middle or front of the moonpool, and can cooperate with a drag-reducing notch on the rear wall of the moonpool to (Continued)

greatly reduce the drag induced by intense sloshing of water in the moonpool during navigation of an offshore vessel. When offshore operations are performed under a station keeping condition, the drag-reducing separator plate is moved to the rear wall of the moonpool to avoid hindering the offshore operations.

19 Claims, 6 Drawing Sheets

(51) Int. Cl.
  *B63B 71/00* (2020.01)
  *B63B 35/03* (2006.01)
(58) Field of Classification Search
  USPC ....................................................... 114/65 R
  See application file for complete search history.

DRAG-REDUCING SEPARATOR PLATE AND DESIGN METHOD THEREFOR

TECHNICAL FIELD

The present invention pertains to the field of ocean engineering and particularly relates to a drag-reducing separator plate and design method therefor.

BACKGROUND ART

Moonpools are widely used in offshore vessels. Drillships or pipe-laying ships all need to be operated through moonpools during drilling or pipe-laying. However, due to the use of a moonpool, the water inside the moonpool will slosh under the excitation of navigation or environmental waves, and the sloshing of the water will induce extra additional drag. The additional drag of the moonpool can be greater than the drag of a bare ship (the hull does not include the moon pool) in extreme cases, thereby significantly increasing fuel consumption.

In recent years, in order to pursue more efficient operation, the design of moonpools tends to be large. Taking a drilling ship with a dual derrick design as an example, the opening of the required moonpool is up to 42 m×15 m or more. The moonpool with a large opening makes the water in the moon pool slosh more intensely, the additional drag larger, and the fuel consumption higher. This makes the moon pool drag reduction technology more difficult and more demanding.

In theory, it can be seen that the drag increase of a moonpool is mainly controlled by the water sloshing amplitude and the momentum of the fluids flowing into and out of the moonpool. The existing drag reducing measures are generally designed to reduce the sloshing amplitude of the water and limit the momentum exchange between the moonpool and the external fluid. The current popular drag reducing devices mainly include: flanges, damping chambers and step moonpool design (recess) that increase damping to reduce water sloshing, and wedge/cut-out devices that restrict the momentum exchange between fluids inside and outside the moonpool.

Generally, the design of a drag reducing device needs to rely on ship model test. However, the limitation of ship model test equipment, experiment cycle and accuracy, the scale effect accompanying the use of a reduced model during ship model test in particular, will cause an uncertainty of the drag reduction effect, an insufficient accuracy of the drag reducing device dimension, and a high price at the drag reduction design scheme suitable for the characteristics of the specific operating water area.

SUMMARY OF THE INVENTION

To address the defects of the existing design of moonpool drag reducing structure, including long time, high price, insufficient accuracy and uncertain drag reduction effect, the present invention provides a drag-reducing separator plate for a moonpool and design method therefor, to separate the moonpool with a drag-reducing separator plate, thereby changing the sloshing mode of the water in the moonpool to reduce the momentum exchange between the water inside and that outside the moonpool and achieve drag reduction.

In order to achieve the foregoing objective, the drag-reducing separator plate provided by the present invention is used in a moonpool, wherein the upper part of the drag-reducing separator plate is a straight wall perpendicular to the sea level, and the lower part of the drag-reducing separator plate is connected to a baffle; a connecting portion is connected between the straight wall and the baffle; the shape of the drag-reducing separator plate matches that of the rear wall of the moonpool; during navigation, the drag-reducing separator plate is located in the middle or front of the moonpool; during station keeping operation, the drag-reducing separator plate is close to the rear wall of the moonpool.

Optionally, for the foregoing drag-reducing separator plate, if the rear wall of the moonpool is an arc notch, the connecting portion is in the shape of an arc, and the radius of the arc is set to be 0.3 to 0.7 of the design draft.

Optionally, for the foregoing drag-reducing separator plate, if the rear wall of the moonpool is a fold-line notch, the connecting portion is in the shape of a fold line, and the included angle of the fold line is set to be 10° to 35°.

Optionally, for the foregoing drag-reducing separator plate, if the rear wall of the moonpool is a straight-line notch, the connecting portion is in the shape of a straight line, and the length of the connecting portion is set to be out of the moonpool by less than 0.5 m.

Optionally, for the foregoing drag-reducing separator plate, the front end of the baffle thereof is connected to the lower part of the drag-reducing separator plate, and the rear end of the baffle extends to the rear wall of the moonpool.

Optionally, the number of the foregoing drag-reducing separator plates is odd.

Optionally, the foregoing drag-reducing separator plate is further connected to rollers, the rollers are seated on sliding rails, the sliding rails are arranged between the front wall and the rear wall of the moonpool and are on the deck, and the drag-reducing separator plate moves on the sliding rails under the drive of the rollers; the drag-reducing separator plate is further connected to a locking device; the locking device comprises an anchor plate and a plurality of anchor sockets, the anchor plate is connected on the drag-reducing separator plate and moves with the drag-reducing separator plate, the anchor sockets are set in different positions along the moving track of the anchor plate, and the anchor sockets lock the drag-reducing separator plate connected by the anchor plate when the anchor plate is inlaid inside the anchor sockets; during navigation, the drag-reducing separator plates are fixed inside the moonpool by the locking devices, and a spacing distance is reserved between the drag-reducing separator plates; during station keeping operation, the drag-reducing separator plates are parked by the locking devices and are close to the rear wall of the moonpool.

Meanwhile, the present invention further provides a design method for the drag-reducing separator plate for a moonpool, comprising the following steps: step 1, establishing a moonpool model according to the characteristics of its navigation and operating water areas; step 2, establishing a model of the drag-reducing separator plate, in the shape close to the shape of the rear wall of the moonpool; and determining the shape of the baffle connected to the lower part of the drag-reducing separator plate according to the shape of the drag-reducing separator plate; and step 3, obtaining the dimensions, structural parameters, positions, numbers and spacing distances of the drag-reducing separator plates and the baffles through numerical simulation calculation or towing tank test according to the foregoing models to reduce transit resistance.

Optionally, in the foregoing design method for the drag-reducing separator plate for a moonpool, the structural parameters of the drag-reducing separator plate and baffle thereof include corresponding arc radius thereof, included angle of the fold line and length or dimensions of each component.

Optionally, in the foregoing design method for the drag-reducing separator plate for a moonpool, the numbers of the drag-reducing separator plates and baffles thereof are odd.

Advantages

The present invention designs a drag-reducing separator plate for a moonpool by using numerical simulation technology of fluid mechanics or ship model test. The upper part of the drag-reducing separator plate is a straight wall perpendicular to the sea level, the lower part of the drag-reducing separator plate is connected to a baffle, and a connecting portion is connected between the straight wall and the baffle. The connecting portion is in the shape of an arc, a fold line, or a straight line. The shape of the drag-reducing separator plate matches that of the rear wall of the moonpool, and can change the water sloshing mode of the moonpool. During navigation, the drag-reducing separator plate is located in the middle or front of the moonpool, and can cooperate with a drag-reducing notch on the rear wall of the moonpool to greatly reduce the drag induced by intense sloshing of water in the moonpool during navigation of an offshore vessel. When offshore operations are performed under a station keeping condition, the drag-reducing separator plate of the present invention is moved to the rear wall of the moonpool to avoid hindering the offshore operations.

Further, the vertical piston oscillations of the waters in the adjacent moonpools separated by a drag-reducing separator plate have opposite phases. Therefore, when an odd number of drag-reducing separator plates are applied in the moonpool, the additional drag of the water in the moonpool will be interleaved and subtracted by the vertical piston oscillations with opposite phases. Therefore, it is more favorable to the further reduction of the overall net drag of the moonpool.

The baffle connected to the lower part of the drag-reducing separator plate can further reduce momentum exchange between the fluids inside and outside the moonpool, thereby enhancing the barrier effect of the drag-reducing separator plate to further play the drag-reducing effect of the drag-reducing separator plate.

DETAILED DESCRIPTION

In order to make the objective and technical solutions of the embodiments of the present invention clearer, the technical solutions in the embodiments of the present invention will be clearly and completely described below in conjunction with the drawings in the embodiments of the present invention. Obviously, the described embodiments are only some, not all of the embodiments of the present invention. All other embodiments obtained by those of ordinary skill in the art without creative work based on the embodiments of the present invention are within the scope of protection of the present invention.

The "front" in the present invention is along the sailing direction of the offshore vessel.

The "rear" in the present invention is the direction opposite the sailing direction of the offshore vessel.

Figure 1:
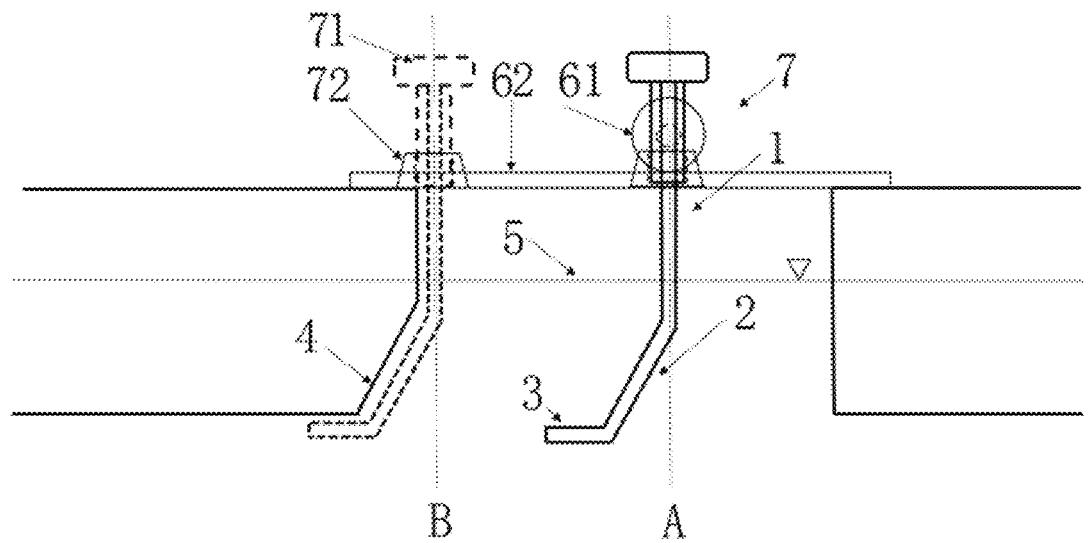
FIG. 1 is a structural schematic view of a drag-reducing separator plate of the present invention applied to a moonpool with the rear wall structure being a fold-line notch.
Figure 2:
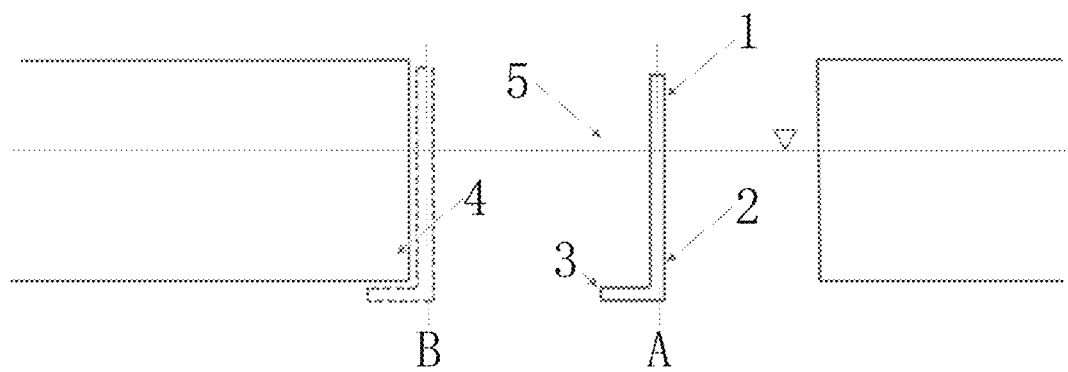
FIG. 2 is a structural schematic view of a drag-reducing separator plate of the present invention applied to a moonpool with the rear wall structure being a straight-line notch.
Figure 3:
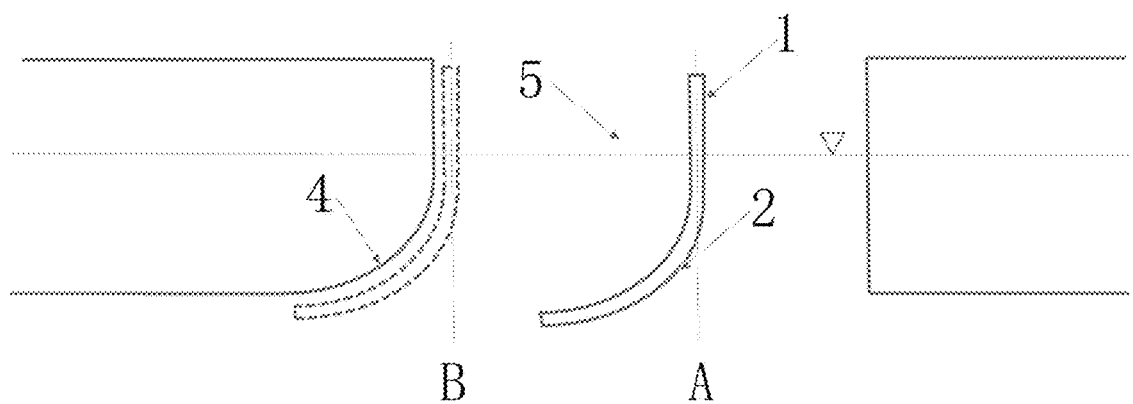
FIG. 3 is a structural schematic view of a drag-reducing separator plate of the present invention applied to a moonpool with the rear wall structure being an arc notch.

FIG. 1 shows a drag-reducing separator plate provided by the present invention, which can move horizontally in the moonpool 5 of an offshore vessel. The drag-reducing separator plate is applied to a moonpool with the rear wall 4 being a fold-line notch. The upper part 1 thereof adopts the design of a straight wall. According to the shape of the rear wall 4 of the moonpool, the connecting portion 2 in the lower part of the separator plate can select a fold-line shape accordingly. As shown in FIG. 2 or FIG. 3, if the structure of the rear wall 4 of the moonpool is a straight-line notch or an arc notch, the connecting portion of the drag-reducing separator plate can select a straight-line shape or arc shape, too accordingly.

The foregoing structure can be designed through ship model test or computational fluid dynamics simulation, so that the shape of the drag-reducing separator plate fully matches the shape of the rear wall of the moonpool and an optimum drag reduction effect is achieved.

Figure 4:
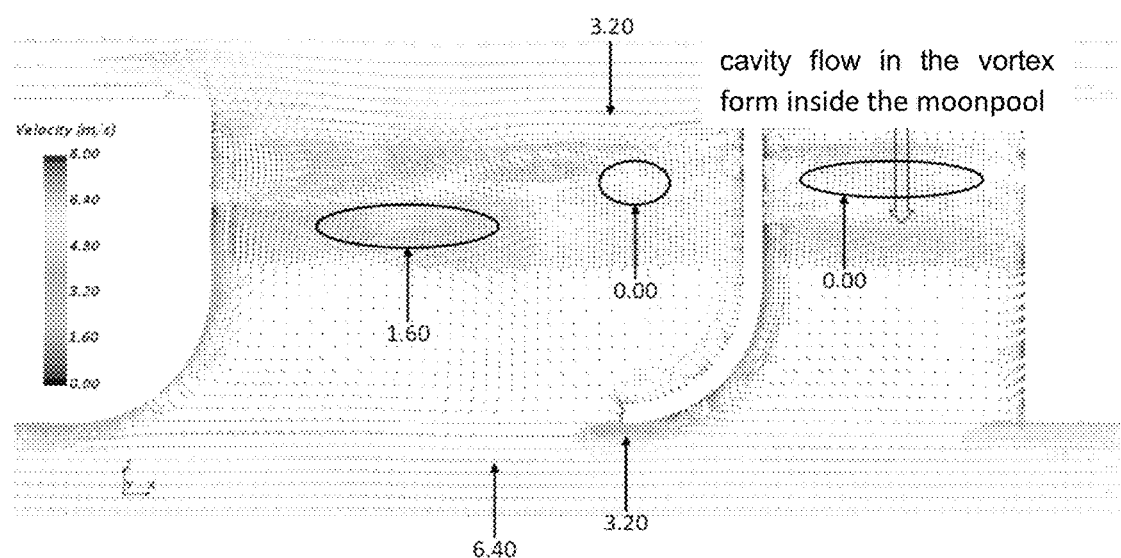
FIG. 4 is a schematic view of the cavity flow in the vortex form after the present invention is applied to the moonpool with the rear wall structure being an arc notch.

Specifically speaking, the structure of the drag-reducing separator plate provided by the present invention is different from that of existing drag reducing device. The existing drag reducing device is only provided with damping flanges on the side wall of the moonpool to reduce the sloshing amplitude of the water in the moonpool and restrict the momentum exchange between the fluids inside and outside the moonpool, thereby achieving the purpose of drag reduction. In addition to adding ordinary damping flanges for example to achieve the purpose of drag reduction, the drag-reducing separator plate provided by the present invention per se can also directly change the water sloshing mode to attenuate the additional drag of a small moonpool divided because for a long moonpool, the separator plates in the middle or front of the moonpool shorten the continuous water in the moonpool, and due to division of water by the drag-reducing separator plates, the water sloshing mode in the moonpool is changed from the original horizontal sloshing to vertical piston oscillation. If an appropriate position distribution of the drag-reducing separator plates is further designed through ship model test or computational fluid dynamics simulation, it will not be difficult to obtain the cavity flow in the vortex form inside the moonpool as shown in FIG. 4. The cavity flow in the vortex form inside the moonpool is relatively stable, and the momentum exchange between the fluids inside and outside the moonpool is greatly reduced, even is blocked. In this state, the water sloshing in the moonpool and the additional drag induced thereby are greatly reduced.

Figure 6:
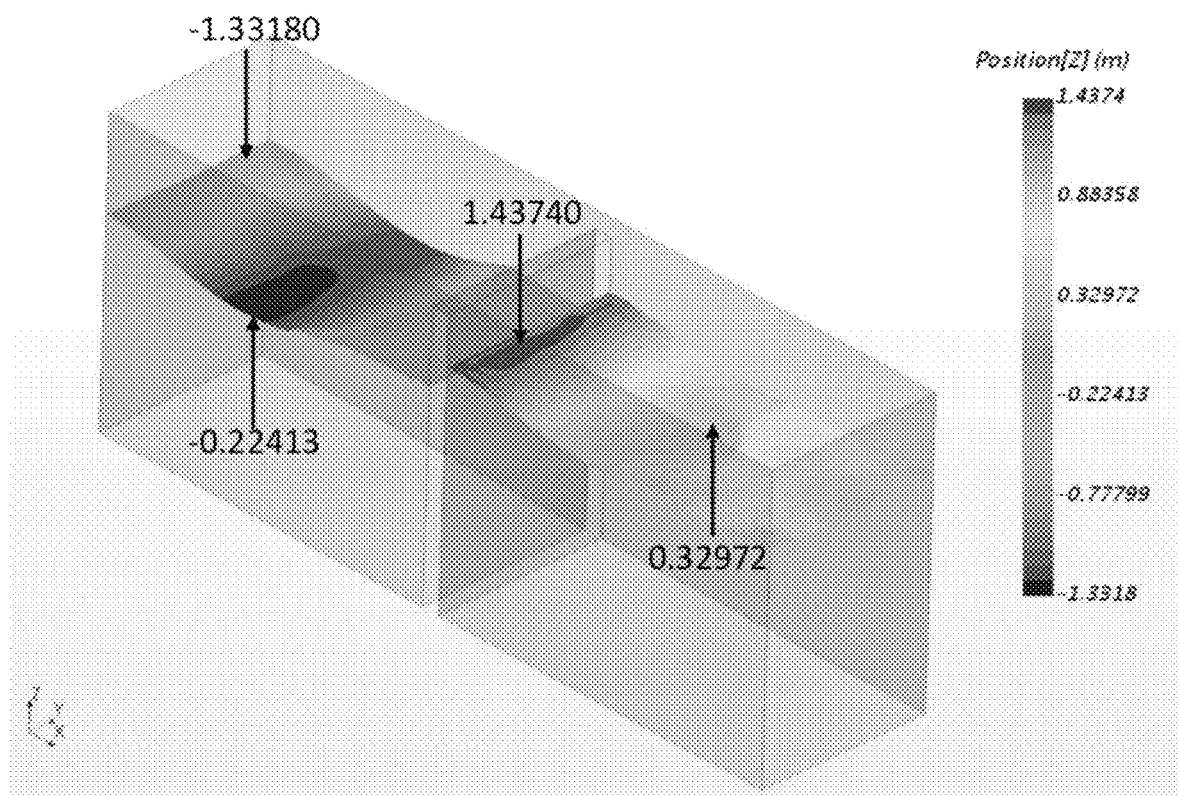
FIG. 6 is a schematic view of inverse vertical piston oscillation of the water between adjacent drag-reducing separator plates as shown in FIG. 5.

Further, in reference to the fluid dynamics simulation result shown in FIG. 6, the vertical piston oscillations of the waters in two adjacent moonpools separated by a drag-reducing separator plate have opposite phases. The opposite phases cause the additional drag between moonpools to be interleaved and subtracted, thereby further reducing the overall net drag of the moonpools.

Figure 7:
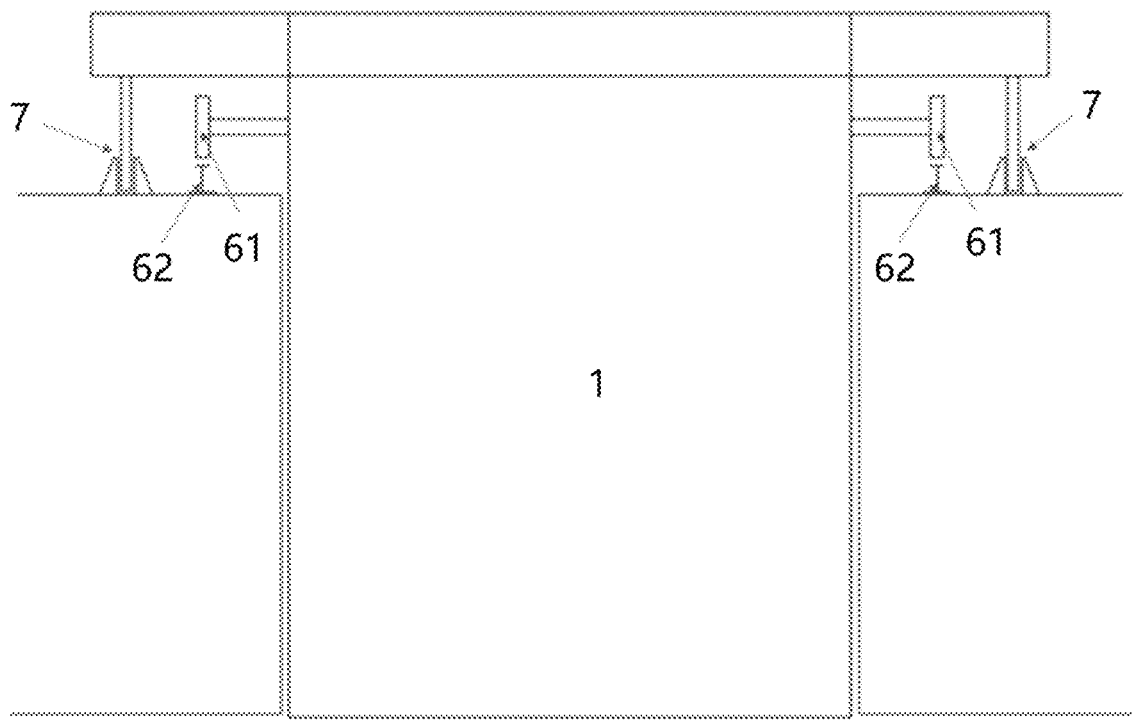
FIG. 7 is a schematic view of the connection method of a chute in the present invention.

Further, the foregoing drag-reducing separator plate can also be set in a movable form. As shown in FIG. 7, it can move freely by means of the cooperation between the sliding rails 62 and the rollers 61 arranged between the front wall and the rear wall of the moonpool. A locking device 7 can be further arranged on the drag-reducing separator plate so that the drag-reducing separator plate is moved and locked to the rear part of the moonpool under the station keeping condition for engineering operations. In this case, as the shape of the drag-reducing separator plate is close to the shape of the rear wall of the moonpool, they can match each other appropriately, thereby reducing the obstruction of the drag-reducing separator plate to the space of the moonpool and facilitating engineering operations. During navigation, the drag-reducing separator plate can be fixed to a position close to the front wall of the moonpool by the locking device 7, specifically, by inlaying the locking device 7 into the anchor sockets by means of the anchor plate. Therefore, by locking the drag-reducing separator plate to different positions of the moonpool, the present invention can deal with the drag reduction demands under different navigational speeds and drafts.

Figure 8:
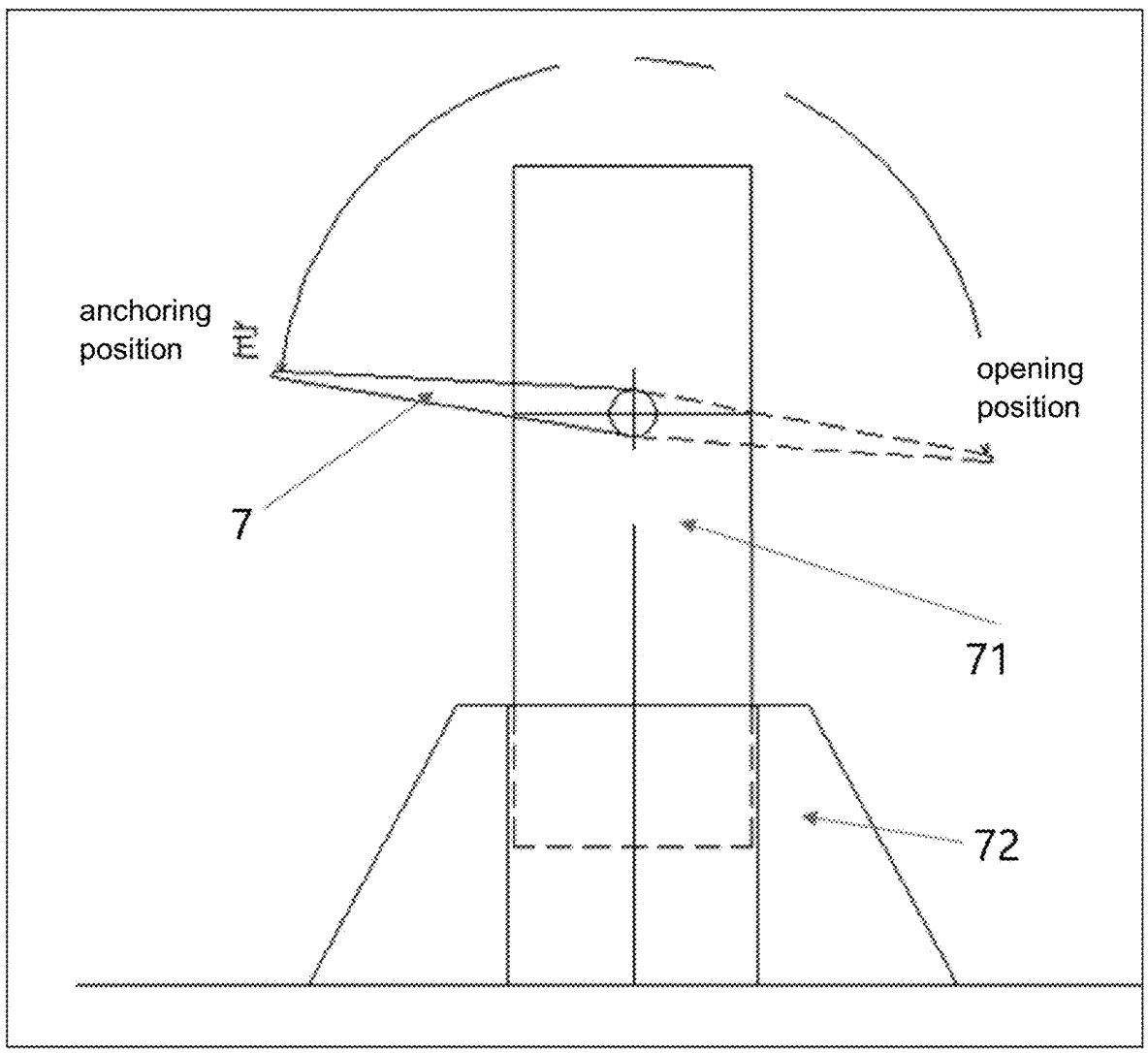
FIG. 8 is a structural schematic view of a locking device in the present invention.

In general, the sliding rail-roller combination and the locking device 7 can be arranged on the deck to avoid being soaked in seawater, reduce their corrosion and facilitate maintenance. The drag-reducing separator plate can be fixed by means of the locking device shown in FIG. 8. When the locking device rotates anticlockwise to the anchoring position, the anchor plate 71 completely falls into the anchor sockets 72 to realize locking; when the locking device rotates clockwise to the opening position, the anchor plate 71 is disengaged from the anchor sockets 72, unlocked and opened. Therefore, the moonpool provided by the present invention can be conveniently applied to well drilling, pipe laying, cable laying and other offshore operation environments, and will not cause interference in offshore operation activities.

In a preferred embodiment of the present invention, the specific parameters of the drag-reducing separator plate in a moonpool can be optimized according to the shape of the rear wall of the existing moonpool. For example, if the rear wall of the moonpool adopts the design of an arc notch, a model can be established according to the characteristics of moonpool and its navigation and operating water areas, then a model of the drag-reducing separator plate in the shape similar to the shape of the rear wall of the moonpool is added along with the baffle 3 connected to the lower part of the drag-reducing separator plate based on the shape of the drag-reducing separator plate. After that, through ship model test or numerical simulation, the dimensions and structural parameters of the drag-reducing separator plate and the baffle 3 with the largest drag reduction effect, or the arc radius of the drag-reducing separator plate are decided.

For a practical example, the drag-reducing separator plate is in the shape matching the rear wall of the moonpool, and the lower part of the drag-reducing separator plate is in the shape of an arc according to the rear wall of the moonpool, as shown in FIG. 4. For another example, the rear wall notch is in the shape of a fold line or a straight wall. In order to match the rear wall of the moonpool, the drag-reducing separator plate will also use the design of a fold line or a straight wall, but a horizontal (or inclined) baffle will be added to the bottom of the separator plate, as shown in FIG. 1 and FIG. 2, so that the separator plate has a better effect of obstructing momentum exchange between the fluids inside and outside the moonpool and further plays a drag reduction effect of the separator plate.

Further, the optimum position of the drag-reducing separator plate in the moonpool is also an important parameter for the design of the separator plate. In general, the drag-reducing separator plate will be arranged in the middle and slight front of the moonpool, so that the opening in the front of the moonpool is smaller and the drag is smaller; while in the rear part of the moonpool, an arc or horizontal/inclined baffle can be used as far as possible to obstruct momentum exchange between the fluids inside and outside the moonpool by means of the shielding effect of the baffle and realize drag reduction.

Regarding different ship speeds and drafts, the optimum position of the drag-reducing separator plate, including horizontal and vertical positions, can also be determined by means of the above modeling approach. Due to the presence of the separator plate, the waters in the moonpool will be under vertical piston oscillation and the oscillation phases of adjacent waters in the moonpool will be opposite. In general, a criterion that can be selected by the optimization objective of simulation design test during confirmation of the optimum position is: to minimize the oscillation amplitude of the waters in the moonpool.

Figure 5:
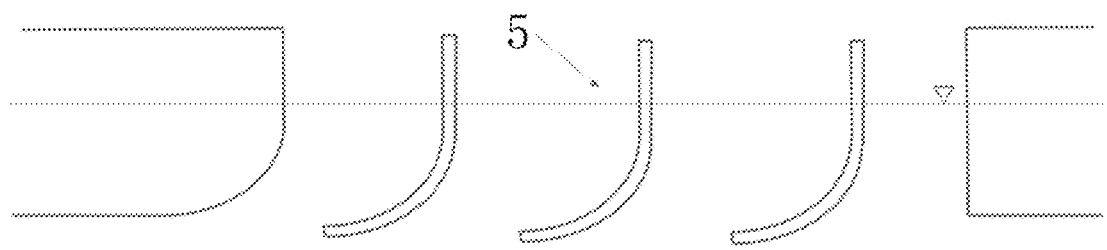
FIG. 5 is a schematic view of position relations among multiple sets of drag-reducing separator plates in the present invention.

In another implementation of the present invention, as shown in FIG. 5, if the moonpool is an extra long moonpool, the design of multiple separator plates can be adopted. In general, the more the drag-reducing separator plates, the better the drag reduction effect; and an odd number of separator plates are better than an even number of separator plates. An odd number of separator plates divide the water of the moonpool into an even number of areas. The even number of additional drags in the even number of water areas can be mutually offset to the maximum extent due to the opposite oscillation phases of the waters. Therefore, an odd number of drag-reducing separator plates lead to a better drag reduction effect of the moonpool. However, considering the complexity and operational convenience of a multiple-separator-plate system, the design will give priority to a minimum number of separator plates in general.

Figure 9:
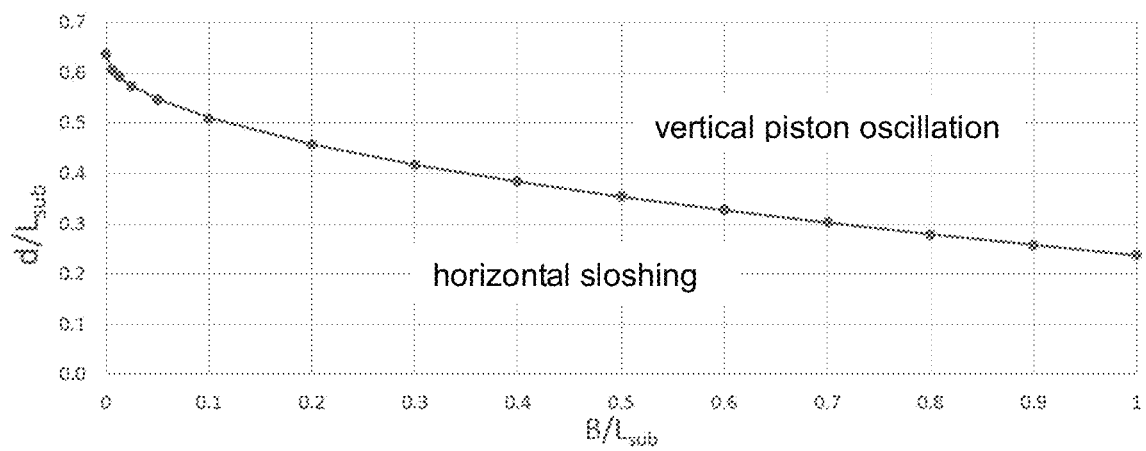
FIG. 9 shows the conditions for separating the moonpool and causing the water to make vertical piston oscillation.

The design method of the present invention for the drag-reducing separator plate in a moonpool mainly includes the following aspects: 1. According to the shape of the rear wall of the moonpool, the drag-reducing separator plate will adopt a shape that can fully match the shape of the rear wall of the moonpool as far as possible; 2. The length of the small moonpools separated by separator plates needs to cause the sloshing of the waters in the moonpools to be vertical piston oscillation; according to draft d and moonpool breath B, the length of small moonpools $L_{sub}$ can be preliminarily decided using the design curve in FIG. 9; 3. The numerical simulation of fluid dynamics or towing tank test can be used to finely adjust the positions of the separator plates and optimize the length of the baffles 3 so that the increased drag of the moonpool is minimized under the preset navigational speed and draft; 4. The load acting upon the drag-reducing separator plates is calculated (numerical simulation of fluid dynamics) or measured (towing tank test), and is used to design the structural dimensions of the separator plates and the locking devices, thereby realizing the design of the drag-reducing separator plates. The drag-reducing separator plates designed in this way divide the moonpool and change the sloshing mode of the water in the moonpool to reduce the momentum exchange between the water inside and that outside the moonpool and realize drag reduction.

To sum up, the upper part of the movable drag-reducing separator plate of the present invention adopts the design of a straight wall, and the geometric shape of the lower part thereof is a right angle, a continuous fold line or a curve depending on the shape of the rear wall of the moonpool. Through ship model test or computational fluid dynamics simulation design, the shape of the separator plate can fully match the shape of the rear wall of the moonpool, and through optimization of the structural and dimensional parameters of the separator plate, the optimum drag reduction effect can be obtained. Under the station keeping condition of engineering operations, the separator plate will be arranged in a position close to the rear wall of the moonpool, position B as shown in FIG. 1 to FIG. 3. The shape of the separator plate matches appropriately the shape of the rear wall of the moonpool to reduce the obstruction of the separator plate to the space of the moonpool and facilitate engineering operations. During navigation, the separator plate needs to move and be locked to a specific position in the moonpool, position A as shown in FIG. 1 to FIG. 3, or the drag-reducing separator plate is set in the way shown in FIG. 5 to cope with the drag reduction demands under different navigational speeds and drafts.

The sliding rails of the movable separator plate are arranged on the deck in general to ensure that they are not soaked in seawater, and to reduce corrosion and facilitate maintenance. The fixation of the separator plate will be realized by means of the locking device shown in FIG. 8. The movable drag-reducing separator plate can be designed to be a multi-separator-plate system to maximally reduce the drag of a long moonpool, as shown in FIG. 5.

In order to maximize the drag reduction effect, the lower end of the movable separator plate needs to be specially designed to minimize the momentum entering the moonpool, so as to reduce the intense sloshing of the water in the moonpool and achieve the drag reduction effect of the moonpool. The present invention generally optimizes the movable separator plate through model test or computational fluid dynamics simulation based on the design navigational speed, moonpool dimensions, and the shape of the drag-reducing notch of the rear wall of the existing moonpool. The optimization parameters include: dimensions and structural parameters of the drag-reducing separator plates and the baffles 3, and the positions, numbers and spacing distance of the separator plates in the moonpool.

The above are only some embodiments of the present invention. Their descriptions are concrete and detailed, but they shall not be therefore understood as limitations to the scope of the present invention patent. It shall be noted that for those skilled in the art, various changes and modifications may be made to the embodiments without departing from the spirit of the present invention. All these shall be in the protective scope of the present invention.

The invention claimed is:

1. A drag-reducing separator plate for a moonpool, wherein
the upper part of the drag-reducing separator plate is a straight wall perpendicular to a sea level (1), and the lower part of the drag-reducing separator plate is connected to a baffle (3); a connecting portion (2) is connected between the straight wall (1) and the baffle (3);
the shape of the drag-reducing separator plate matches that of the rear wall of the moonpool;
during navigation, the drag-reducing separator plate is located in the middle or front of the moonpool; and
during station keeping operation, the drag-reducing separator plate is close to the rear wall of the moonpool;
wherein if the rear wall of the moonpool is a fold-line notch, the connecting portion (2) is in the shape of a fold line, and the included angle of the fold line is set to be 10 degrees to 35 degrees.

2. The drag-reducing separator plate according to claim 1, wherein if the rear wall of the moonpool is an arc notch, the connecting portion (2) is in the shape of an arc.

3. The drag-reducing separator plate according to claim 1, wherein if the rear wall of the moonpool is a straight-line notch, the connecting portion (2) is in the shape of a straight line, and the length of the connecting portion (2) is set to be out of the moonpool by less than 0.5 m.

4. The drag-reducing separator plate according to claim 1, wherein the front end of the baffle (3) is connected to the lower part of the drag-reducing separator plate, and the rear end of the baffle (3) extends to the rear wall of the moonpool.

5. The drag-reducing separator plate according to claim 1, wherein the number of the foregoing drag-reducing separator plates is odd.

6. The drag-reducing separator plate according to claim 5, wherein the drag-reducing separator plate is further connected to rollers (61), the rollers (61) are connected to sliding rails (62), the sliding rails (62) are arranged between the front wall and the rear wall of the moonpool and are on a deck, and the drag-reducing separator plate moves on the sliding rails (62) under the drive of the rollers (61);
the drag-reducing separator plate is further connected to a locking device (7); the locking device comprises an anchor plate (71) and a plurality of anchor sockets (72), the anchor plate (71) is connected on the drag-reducing separator plate and moves with the drag-reducing separator plate, the anchor sockets are set in different positions along the moving track of the anchor plate and the anchor sockets (72) lock the drag-reducing separator plate connected by the anchor plate (71) when the anchor plate (71) is inlaid inside the anchor sockets (72);
during navigation, the drag-reducing separator plates are fixed inside the moonpool by the locking devices (7), and a spacing distance is reserved between the drag-reducing separator plates; and
during station keeping operation, the drag-reducing separator plates are fixed by the locking devices and are close to the rear wall of the moonpool.

7. A design method for a drag-reducing separator plate for a moonpool, wherein the design method comprises the following steps:
step 1, establishing a model according to the characteristics of the moonpool, its navigation and operating water areas;
step 2, establishing a model of a drag-reducing separator plate, in the shape close to the shape of the rear wall of the moonpool; and determining the shape of the baffle (3) connected to the lower part of the drag-reducing separator plate according to the shape of the drag-reducing separator plate; and
step 3, obtaining the dimensions, structural parameters, positions, numbers and spacing distances of the drag-reducing separator plates and the baffles (3) through numerical simulation calculation or towing tank test according to the foregoing models to reduce sailing resistance.

8. The design method for the drag-reducing separator plate for a moonpool according to claim 7, wherein the structural parameters of the drag-reducing separator plate and baffle (3) thereof include corresponding arc radius thereof, included angle of the fold line and length or dimensions of each component.

9. The design method for the drag-reducing separator plate for a moonpool according to claim 7, wherein the numbers of the drag-reducing separator plates and the baffles (3) thereof are odd.

10. The drag-reducing separator plate according to claim 2, wherein if the rear wall of the moonpool is a straight-line notch, the connecting portion (2) is in the shape of a straight line, and the length of the connecting portion (2) is set to be out of the moonpool by less than 0.5 m.

11. The drag-reducing separator plate according to claim 2, wherein the front end of the baffle (3) is connected to the lower part of the drag-reducing separator plate, and the rear end of the baffle (3) extends to the rear wall of the moonpool.

12. The drag-reducing separator plate according to claim 2, wherein the number of the foregoing drag-reducing separator plates is odd.

13. The drag-reducing separator plate according to claim 12, wherein the drag-reducing separator plate is further connected to rollers (61), the rollers (61) are connected to sliding rails (62), the sliding rails (62) are arranged between the front wall and the rear wall of the moonpool and are on a deck, and the drag-reducing separator plate moves on the sliding rails (62) under the drive of the rollers (61);

the drag-reducing separator plate is further connected to a locking device (7); the locking device comprises an anchor plate (71) and a plurality of anchor sockets (72), the anchor plate (71) is connected on the drag-reducing separator plate and moves with the drag-reducing separator plate, the anchor sockets are set in different positions along the moving track of the anchor plate and the anchor sockets (72) lock the drag-reducing separator plate connected by the anchor plate (71) when the anchor plate (71) is inlaid inside the anchor sockets (72);

during navigation, the drag-reducing separator plates are fixed inside the moonpool by the locking devices (7), and a spacing distance is reserved between the drag-reducing separator plates; and during station keeping operation, the drag-reducing separator plates are fixed by the locking devices and are close to the rear wall of the moonpool.

14. The drag-reducing separator plate according to claim 1, wherein if the rear wall of the moonpool is a straight-line notch, the connecting portion (2) is in the shape of a straight line, and the length of the connecting portion (2) is set to be out of the moonpool by less than 0.5 m.

15. The drag-reducing separator plate according to claim 1, wherein the front end of the baffle (3) is connected to the lower part of the drag-reducing separator plate, and the rear end of the baffle (3) extends to the rear wall of the moonpool.

16. The drag-reducing separator plate according to claim 1, wherein the number of the foregoing drag-reducing separator plates is odd.

17. The drag-reducing separator plate according to claim 16, wherein the drag-reducing separator plate is further connected to rollers (61), the rollers (61) are connected to sliding rails (62), the sliding rails (62) are arranged between the front wall and the rear wall of the moonpool and are on a deck, and the drag-reducing separator plate moves on the sliding rails (62) under the drive of the rollers (61);

the drag-reducing separator plate is further connected to a locking device (7); the locking device comprises an anchor plate (71) and a plurality of anchor sockets (72), the anchor plate (71) is connected on the drag-reducing separator plate and moves with the drag-reducing separator plate, the anchor sockets are set in different positions along the moving track of the anchor plate and the anchor sockets (72) lock the drag-reducing separator plate connected by the anchor plate (71) when the anchor plate (71) is inlaid inside the anchor sockets (72);

during navigation, the drag-reducing separator plates are fixed inside the moonpool by the locking devices (7), and a spacing distance is reserved between the drag-reducing separator plates; and during station keeping operation, the drag-reducing separator plates are fixed by the locking devices and are close to the rear wall of the moonpool.

18. The drag-reducing separator plate according to claim 3, wherein the front end of the baffle (3) is connected to the lower part of the drag-reducing separator plate, and the rear end of the baffle (3) extends to the rear wall of the moonpool.

19. The drag-reducing separator plate according to claim 3, wherein the number of the foregoing drag-reducing separator plates is odd.

* * * * *